3,301,762
METHOD OF SUPERHEATING STEAM ORIGINATING FROM A STEAM GENERATOR OF A PRESSURIZED WATER NUCLEAR REACTOR
Jons Arthur Dahlgren, Nejlikevagen 6,
Saltsjobaden, Sweden
Filed Aug. 24, 1965, Ser. No. 482,194
Claims priority, application Sweden, Sept. 16, 1964,
11,081/64
2 Claims. (Cl. 176—65)

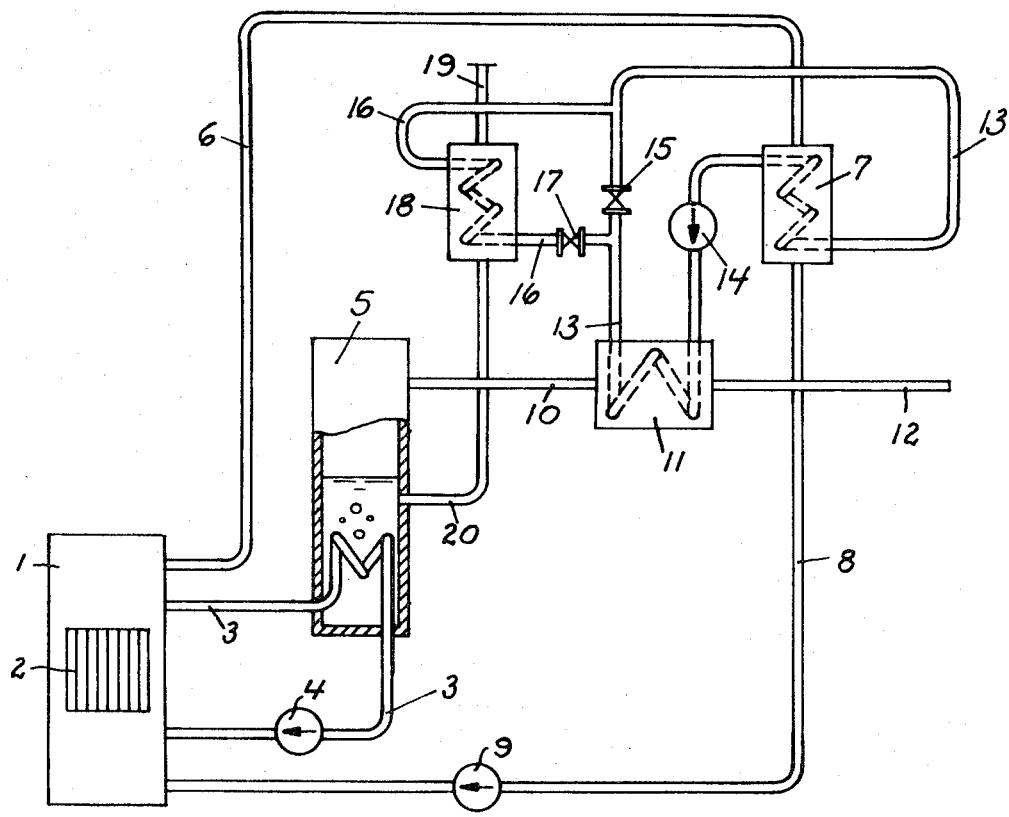

This invention relates to a steam generator of the type disclosed in U.S. Patent 3,197,380. In that patent superheating steam originates from a steam generator of a nuclear reactor of the pressurized water type by passing a minor portion of the pressurized water through a heat exchanger (primary heat exchanger) in which it heats an auxiliary liquid, said heated auxiliary liquid being passed through a second heat exchanger (superheater) in which it superheats the steam. The basic advantage produced by said invention is that the radioactive pressurized water gives up its heat in a heat exchanger of the type liquid-liquid. Consequently, said heat exchanger can be of a very small dimension. This is important since this heat exchanger must, for the sake of safety, be made from an expensive material and of an expensive construction. The superheater operates with a gaseous fluid and must therefore have a large heat-exchanging surface. However, the superheater is not connected to the pressurized water. Consequently, the material and the construction of the superheater may be of an inexpensive type. Therefore, the entire assembly will be considerably less expensive than if the auxiliary liquid were omitted and the superheaters would have to be operated with the pressurized water.

The usefulness of the basic advantage mentioned above is dependent on how the process is carried out in its details. The patent specification above referred to discloses two main embodiments, namely:

(a) The auxiliary liquid is pumped in a closed circuit under pressure through the various heat exchangers, and feed water is supplied to the steam generator directly separated from said closed circuit;

(b) The feed water is used as auxiliary liquid, and is supplied to the steam generator via the primary heat exchanger and the superheater, which are connected in series. The closed circuit for the auxiliary liquid is omitted, resulting in a simplified apparatus.

There is a thermo-technical difference and a difference in power demand between the two embodiments described above. The heating of the comparatively cold feed water in the primary heat exchanger of embodiment (b) takes place at a considerably higher temperature difference between the heat-exchanging fluids than is the case in embodiment (a), in which said comparatively cold feed water mixes with the boiling water in the steam generator. This circumstance offers the advantage that the total heat-exchanging surface can be kept smaller in embodiment (b) than in embodiment (a), thus involving a thermo-technical advantage of embodiment (b).

On the other hand, the higher power required for the feed water pumps may involve a serious inconvenience. In the primary heat exchanger of embodiment (b) the feed water is heated to a much higher temperature, required for the superheating, than is the case in the steam generator of embodiment (a). This means that the feed water in the primary heat exchanger, if it shall not boil, must have a pressure which is much higher than the pressure in the steam generator, namely at least the pressure of saturated steam of the higher temperature referred to above. Of course, the feed water must be pumped against this higher pressure. The difference in pressure may amount to several tens of atmospheres. In the closed auxiliary liquid circuit of embodiment (a) any desired pressure may be maintained without affecting the power of the pumps.

The main object of the invention is to obtain the thermo-technical advantage referred to above without any significant increase of the power of the feed water pumps. The method of the invention is characterized in that at least part of the auxiliary liquid, after having superheated the steam, is passed through an additional heat exchanger in which it is allowed to heat feed water which is passed to the steam generator, said auxiliary liquid being separate from the feed water.

The invention will be described below with reference to the accompanying drawing, the single figure of which discloses the flow-sheet of an embodiment of the invention.

The major portion of the hot pressurized water from a reactor 1 having a core 2 containing the fissile material is pumped through a circuit comprising a conduit 3, a pump 4, and a steam generator 5. A minor portion of said hot pressurized water is pumped through a second circuit comprising a conduit 6, a heat exchanger 7, a conduit 8 and a pump 9. The steam from the steam generator is discharged through a conduit 10, a superheater 11 and a conduit 12 to a turbine which is not shown. An auxiliary liquid is circulated through a circuit comprising a conduit 13, a pump 14, a regulating valve 15, the heat exchanger 7 and the superheater 11. The auxiliary liquid is first heated by the pressurized water in the heat exchanger to a temperature which is considerably higher than the temperature of the steam from the steam generator. Subsequently, the auxiliary liquid is cooled in the superheater by superheating the steam. So far the device operates according to embodiment (a) referred to above.

The novel feature of the invention resides in that auxiliary liquid from the superheater, having a temperature which is not considerably higher than the temperature in the steam generator, can be passed through a branch conduit 16, containing a regulating valve 17, through an additional heat exchanger 18 in which it is allowed to heat the feed water, which is passed through said heat exchanger to the steam generator via conduits 19 and 20. In this way the comparatively cold feed water can, as in embodiment (b), be heated to the temperature of the steam generator at a high temperature difference, while the temperature in the heat exchanger does not increase so much that the pressure in the feed water space of the heat exchanger has to be kept considerably higher than the pressure in the steam generator. Consequently, the power of the feed water pumps need not be significantly increased. By regulating the valves 15 and 17 the amount of liquid through the branch circuit can be varied, and consequently also the degree of heating of the feed water. It is an additional advantage of the invention that the auxiliary liquid will undergo an additional cooling before re-entering heat exchanger 7, resulting in that said heat exchanger will operate at a higher temperature difference between the heat-exchanging fluids.

What is claimed is:
1. In a method of superheating steam originating from a steam generator of a pressurized water nuclear reactor, involving passing a minor portion of the pressurized water through a first heat exchanger in which it is allowed to heat an auxiliary liquid, and passing said heated auxiliary liquid through a second heat exchanger in which it is allowed to superheat the steam, the improved procedure wherein at least part of the auxiliary liquid, after having superheated the steam, is passed through a third heat exchanger in which it is allowed to heat feed water which is passed to said steam generator.

2. A nuclear reactor device for the production of superheated steam comprising a nuclear reactor of the pressurized water type, a steam generator, a first heat exchanger, a second heat exchanger, a steam superheater, means for passing a major portion of the pressurized water from the reactor through the steam generator in heat exchange with water contained therein, means for recirculating the major portion of the pressurized water from the steam generator to the reactor, means for passing the steam produced in the steam generator through the superheater, means for passing a minor portion of the pressurized water from the reactor through the first heat exchanger, means for recirculating the minor portion of the pressurized water from the first heat exchanger to the reactor, means for passing an auxiliary liquid through the first heat exchanger in heat exchange with the minor portion of the pressurized water, means for passing the auxiliary liquid from the first heat exchanger through the superheater in heat exchange with the steam passing through the superheater, means for passing feed water through the second heat exchanger to the steam generator, and means for passing part of the auxiliary liquid from the superheater through the second heat exchanger in heat exchange with the feed water passing through said second heat exchanger.

References Cited by the Examiner

UNITED STATES PATENTS 3,197,380   7/1965   Dahlgren _____ 176—65

REUBEN EPSTEIN, *Primary Examiner.*